US008856347B2

(12) United States Patent
Broadhurst et al.

(10) Patent No.: US 8,856,347 B2
(45) Date of Patent: Oct. 7, 2014

(54) EFFICIENT SELECTION OF A MESSAGING MULTIPLEXED CHANNEL INSTANCE

(75) Inventors: Peter A. Broadhurst, Hampshire (GB);
Paul G. Clarke, Hampshire (GB);
Michael Horan, Hampshire (GB);
Jitendra K. A. Patel, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 954 days.

(21) Appl. No.: 12/248,069

(22) Filed: Oct. 9, 2008

(65) Prior Publication Data

US 2010/0095006 A1    Apr. 15, 2010

(51) Int. Cl.
*G06F 15/16* (2006.01)
(52) U.S. Cl.
USPC ........... 709/227; 709/226; 709/228; 709/229; 370/310; 370/431; 370/437
(58) Field of Classification Search
USPC ......... 709/227; 370/347, 310, 437; 455/533.1
See application file for complete search history.

(56) References Cited

U.S. PATENT DOCUMENTS

| | | | | |
|---|---|---|---|---|
| 5,583,793 | A * | 12/1996 | Gray et al. | 709/223 |
| 5,926,458 | A | 7/1999 | Yin | |
| 5,935,215 | A | 8/1999 | Bell et al. | |
| 6,189,025 | B1 * | 2/2001 | Ogura et al. | 709/203 |
| 6,359,883 | B1 | 3/2002 | Lechleider | |
| 6,760,594 | B1 * | 7/2004 | Murasawa et al. | 455/512 |
| 7,120,697 | B2 | 10/2006 | Aiken, Jr. et al. | |
| 2002/0172175 | A1 | 11/2002 | Okamura | |
| 2005/0286415 | A1 * | 12/2005 | Guo | 370/225 |
| 2007/0076642 | A1 * | 4/2007 | Chien et al. | 370/310 |
| 2008/0137634 | A1 * | 6/2008 | Hassan et al. | 370/343 |

FOREIGN PATENT DOCUMENTS

| | | |
|---|---|---|
| GB | EP 0 733 971 A2 | 9/1996 |
| WO | WO 01/22663 A1 | 3/2001 |
| WO | WO 01/48976 A2 | 7/2001 |

OTHER PUBLICATIONS http://citeseerx.ist.psu.edu/viewdoc/download?doi=10.1.1.156.
1083&rep=rep1&type=pdf "LAC: Load-Aware Channel Selection in 802.11 WLANs"—Jul. 2007 PSU.*
"Selection of the most suitable distribution channel using fuzzy Analytic Hierarchy Process in Turkey"—Int. J. Logistics and Management, May 2008.*
Notice of Allowance mailed Apr. 19, 2011 received in related U.S. Appl. No. 12/248,078.

* cited by examiner

*Primary Examiner* — Randy Scott
(74) *Attorney, Agent, or Firm* — Scully, Scott, Murphy & Presser PC; Dermott Cooke, Esq.

(57) ABSTRACT

A method, system and article of manufacture are disclosed for selecting a channel instance for connecting a client application with a server application in a multi-channel computer system. In this computer system, when a new channel instance is used to connect one of the client applications with one of the server applications, defined channel instance information is established for the channel instance. The method of this invention comprises the steps of when a new application connection request is made, locking existing channel instance information; and after said locking, scanning through a list of channel instance connections for one of the channel instances that is a candidate channel instance for that new application connection request. The method comprises the further steps of, in response to finding a candidate channel instance, determining whether the candidate channel instance is suitable for the new application connection request.

20 Claims, 4 Drawing Sheets

EFFICIENT SELECTION OF A MESSAGING MULTIPLEXED CHANNEL INSTANCE

CROSS REFERENCE TO RELATED APPLICATIONS

The present application is related to concurrently filed U.S. patent application Ser. No. 12/248,078 for "A Flexible Procedure For Quiescing Multiplexed Client Messaging Conversations," and Ser No. 12/248,087 for "Configuration For Messaging Multiplexed Channel Instances With Varying Connection Speeds," the disclosure of which are herein incorporated by reference in their entireties as if set forth fully herein.

BACKGROUND OF THE INVENTION

1. Field of the Invention

This invention generally relates to distributed multi-channel computer systems, and more specifically, to efficient selection of a messaging multiplexed channel instances in such systems.

2. Background Art

Distributed computing systems are in common use today, as they offer many important advantages, including large capacity, quick response, distributed workloads, high reliability and extensive resources and functionalities. In these systems, a number of client applications, running on one or more client computers or stations, communicate with a number of server applications, running on one or more server computers. A number of communications channel instances are provided for handling the communications between the client and server applications; and when a client application requests access to a server application, one of those channel instances is selected to handle the communications traffic between the two applications. With current technology, a single channel instance can handle communications in both directions between a client and a server, and, in fact, one channel instance can handle communications in both directions between multiple client applications and a server. This technology increases very substantially the amount of communications that can be handled by a given number of channel instances. When single channel instances handle communications between plural client applications and a server, selecting the appropriate channel instance for the communications between a client application and a server may be difficult because different communication streams require different protocols. A specific protocol is established for a given channel instance; only communications that can be handled using that protocol can be added to that channel instance.

Application connections from a messaging client may be multiplexed over a single communications channel instance, such as a TCP/IP socket. The first application connection on a particular channel instance causes the protocol set-up (e.g. socket) flows to occur, which are followed by other flows which determine the nature of the connectivity on that messaging channel instance/socket. For instance, the value of a messaging heartbeat interval may be negotiated at this stage (the heartbeat being sent on an idle channel instance to check for connectivity problems). Another example of these subsequent flows may involve an SSL handshake, which allows for mutual authentication of the parties at both ends of the channel instance, and sets up algorithms for subsequent data encryption and data hashing.

Subsequent application connections can only multiplex onto a particular channel instance if the channel characteristics, such as SSL connectivity, specified for the application connection match those associated with that channel instance. They can also only multiplex onto a channel instance if that channel instance supports multiplexing and has not reached its multiplexing limit. So, once the first connection on the channel instance has completed its connection flows, a new matching application connection will multiplex with it provided that the channel instance is configured to support multiplexing after its initial flows are complete.

The problem with this scenario is that while channel instances are first connecting, there can be a significant delay, for instance SSL negotiation is very processing-intensive, slow lines may be involved to transmit the negotiation flows, overloaded systems may not respond promptly, connection attempts to invalid destinations can be particularly lengthy. If an attempt is made to make a new application connection with characteristics which match a channel instance connection that is still in the process of connecting, it is impossible to tell immediately whether this new application connection can be multiplexed on this channel instance or not.

One very simple solution to this problem is to disregard connecting channels when looking for a matching channel instance. With this approach, when a number of identical SSL connections from a particular client are all started at almost the same time, the first connection would get into the connecting state on a particular channel instance. The second connection would not attempt to multiplex onto that channel instance, as it was still connecting, and would connect on a new channel instance. And so would the third connection, etc. So, the end result is many different channel instances connected, when with appropriate waiting, all of the application connections could have used the same one channel instance. If these application connection attempts were instead made to wait for the initial channel instance set-up to complete, multiplexing would be maximized and hence resource usage minimized.

One simple way to enforce such a wait is to lock access to all the existing channel connection information while a new channel instance is connecting. The lock is freed once the channel instance set up flows have completed; at this stage, all channel instances will be in a connected state and a matching one with room to multiplex can be securely found.

This solution ensures that opportunities for multiplexing are fully utilized; it is also reliable and simple. It does, however, have clear drawbacks with regard to performance. A channel instance may be in the process of connecting but be subject to severe connection delays. During this period, many application requests may be made to connect with completely different channel instance characteristics to those specified on the delayed channel instance. These application connections could succeed independently of the delayed channel instance connection, as they would occur on a different channel instance/socket, but are prevented from doing so because of the lock set by the delayed channel instance.

SUMMARY OF THE INVENTION

An object of this invention is an efficient selection of a messaging multiplexed channel instance in a distributed computing environment.

Another object of the present invention is to lock existing channel instance information, in a multi-channel computing environment, when a new application connection request is made, and then to search for a matching channel instance that is not full.

A further object of the invention is, when an application connection request is made in a multi-channel computer system, preferentially to use a ready, matching channel instance (that has capacity); and if such a channel instance is not available, to look for a resource that may match, and to queue the request against this soon-to-be available channel instance.

These and other objectives are attained with a method, system and article of manufacture for selecting a channel instance for connecting a client application with a server application in a multi-channel computer system. The computer system includes a multitude of client applications, a multitude of server applications and a multitude of channel instances for connecting the client applications with the server applications. In this computer system, when a new channel instance is used to connect one of the client applications with one of the server applications, defined channel information is established for the new channel instance. The method of this invention comprises the steps of when a new application connection request is made, locking existing channel instance information; and after said locking, scanning through a list of channel instance connections for one of the channel instances that is a candidate channel instance for said new connection request. The method comprises the further step of, in response to finding a candidate channel instance, determining whether the candidate channel instance is suitable for the new application connection request.

For example, the scanning step may include the step of first scanning through the list of channel instance connections for a completed or an incompleted channel instance connection that is suitable for the new application connection request. If a suitable completed channel instance connection is found, the application connection request may be multiplexed onto this channel instance. If no suitable completed channel instance connection is found, but a suitable incompleted channel instance connection is found, the application connection request may be queued against this incompleted channel instance connection. If no suitable completed or incompleted channel instance connection is found, then a new channel instance connection may be started for the application connection request.

With the preferred embodiment of the invention, described below in detail, existing channel instance information is not locked while each new channel connects, and instead, existing channel instance information is locked when a new application connection request is made. Once locked, a search is made for a matching channel instance which is not full. If one is found and it is not in the process of connecting, the new application connection request is multiplexed onto it. If it does not find such a channel instance at all, a new channel instance is started. But in the case where it does not find a matching channel instance to multiplex onto immediately, but instead finds a matching channel instance which is still connecting, this application connection is queued with others which may be waiting on this channel instance connection. A check is made in case too many such application connections are queued; would a previously negotiated multiplexing limit be exceeded if another application connection were multiplexed onto this channel instance? If it would be, a new channel instance is started. If the channel instance connection attempt succeeds, the waiting application connections are informed of this completion state, relock and rescan the channel instance information. In general, these waiting applications end up successfully and immediately multiplexing on the newly connected channel instance.

When compared to an approach in which all connecting channel instances are discounted as possible matches, the invention ensures that multiplexing levels are maximized. With this invention if multiple identical application connection attempts are made at very similar times, they wait for the first to connect and then multiplex on that channel instance When compared to an approach in which the channel instance connection information is locked until each application connection has completed, this allows other application connection attempts which do not match the criteria for the connecting channel instance to succeed while the connecting channel instance is still negotiating, and even allows matching attempts which exceed the expected multiplexing limits on the connecting channel instance to start their own application connection in parallel on a different channel instance/socket.

Further benefits and advantages of this invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
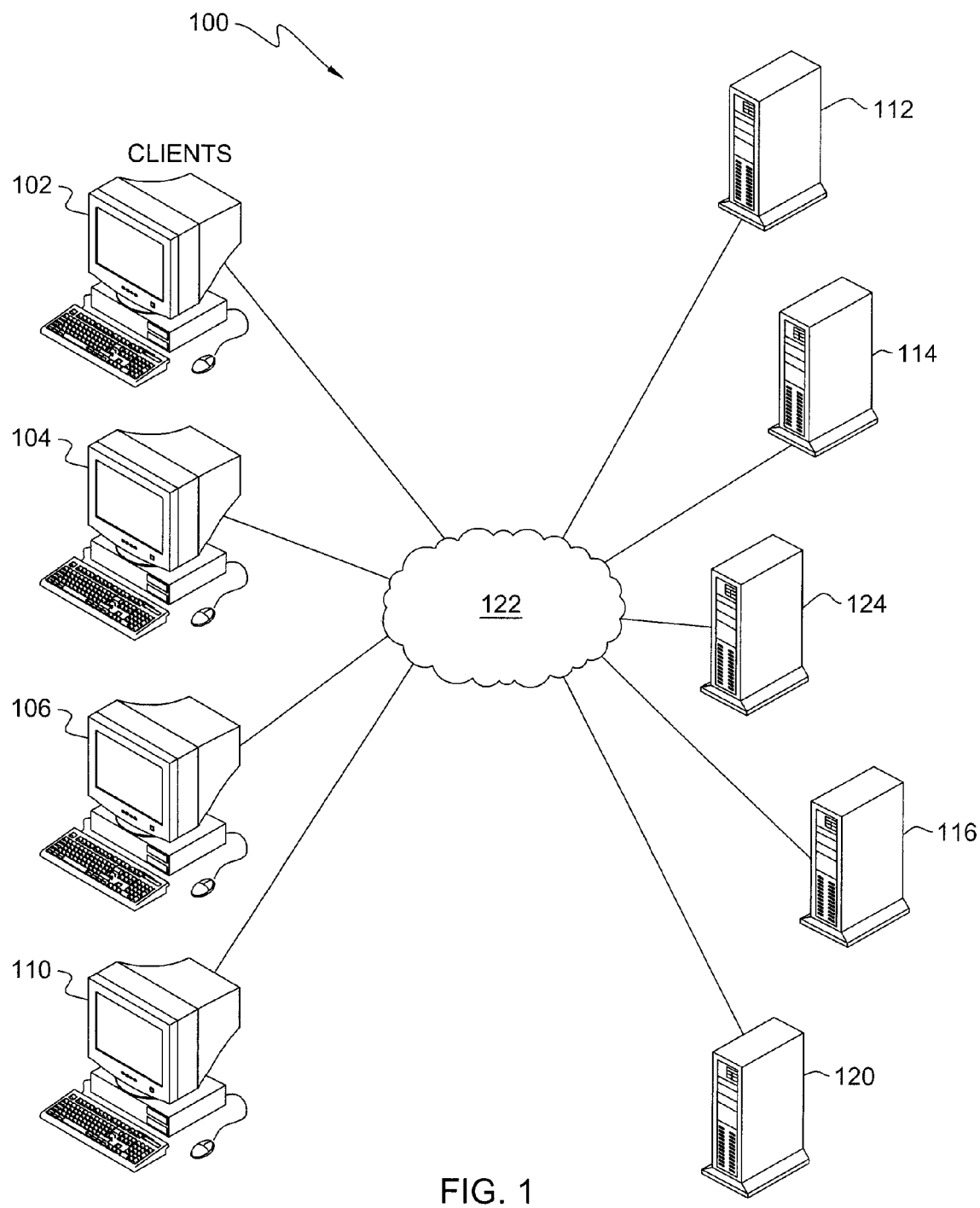
FIG. 1 illustrates a distributed computing environment in which the present invention may be practiced.

FIG. 1 shows a distributed computing system 100 including clients 102, 104, 106 and 110, and servers 112, 114, 116 and 120. The clients communicate over network 122 with a processor 124 that performs workload management and distributes communications for connection to the servers. The processor 124 may also function as a server and, thus, may be the endpoint of communications with the clients.

In operation, when the distributing processor 124 receives communications requests from the clients, the distributing processor routes those communications to appropriate ones of the servers, and establishes communications channel instances between the clients and the servers. These communication channel instances need not go through the distributing processor. Each of these channel instances preferably can carry communications in both directions between a client and a server and can also carry communications between plural or multiple client applications and a server.

Application connections from a messaging client may be multiplexed over a single communications channel instance, such as a TCP/IP socket. The first application connection on a particular channel instance causes the protocol set-up (e.g., socket) flows to occur, which are followed by other flows which determine the nature of the connectivity on that messaging channel instance/socket. For instance, the value of a messaging heartbeat interval may be negotiated at this stage (the heartbeat being sent on an idle channel instance to check for connectivity problems). Another example of these subsequent flows may involve an SSL handshake, which allows for mutual authentication of the parties at both ends of the channel instance, and sets up algorithms for subsequent data encryption and data hashing. As discussed below, in the preferred embodiment of this invention, the level and presence of multiplexing on this channel instance is another item which is negotiated in these flows.

Subsequent application connections can only multiplex onto a particular channel instance if the channel instance characteristics, such as SSL connectivity, specified for the application connection match those specified for that channel instance. They can also only multiplex onto a channel instance if that channel instance supports multiplexing and has not reached its multiplexing limit. So, once the first application connection on the channel instance has completed its connection flows, a new matching application connection will multiplex with that channel instance provided that the channel instance is configured to support multiplexing after its initial flows are complete.

One problem with this scenario is that while channel instances are first connecting, there can be a significant delay, for instance SSL negotiation is very processing-intensive, slow lines may be involved to transmit the negotiation flows, overloaded systems may not respond promptly, connection attempts to invalid destinations can be particularly lengthy. If an attempt is made to make a new application connection with characteristics which match one which is still in the process of connecting, it is impossible to tell immediately whether this can be multiplexed on this channel instance or not.

The present invention effectively addresses this challenge.

With the preferred embodiment of the invention, existing channel instance information is not locked while each new channel instance connects, and instead, existing channel instance information is locked when a new application connection request is made. Once locked, a search is made for a matching channel instance which is not full. If one is found and it is not in the process of connecting, the new application connection request is multiplexed onto it. If it does not find such a channel instance at all, a new channel instance is started. But in the case where it does not find a matching channel instance to multiplex onto immediately, but instead finds a matching channel instance which is still connecting, this application connection is queued with others which may be waiting on this channel instance connection. A check is made in case too many such application connections are queued; would a previously negotiated multiplexing limit be exceeded if another connection were multiplexed onto this channel instance: If it would be, a new channel instance is started. If the channel instance connection attempt succeeds, the waiting application connections are informed of this completion state, relock and rescan the channel instance information. In general, these waiting application connections end up successfully and immediately multiplexing on the newly connected channel instance.

When compared to an approach in which all connecting channel instances are discounted as possible matches, the invention ensures that multiplexing levels are maximized. With this invention, if multiple identical application connection attempts are made at very similar times, they wait for the first to connect and then multiplex on that channel instance.

When compared to an approach in which the channel instance connection information is locked until each application connection has completed, this allows other application connection attempts which do not match the criteria for the connecting channel instance, to succeed while the connecting channel instance is still negotiating, and even allows matching attempts which exceed the expected multiplexing limits on the connecting channel instance to start their own application connection in parallel on a different channel instance/socket.

Figure 2:
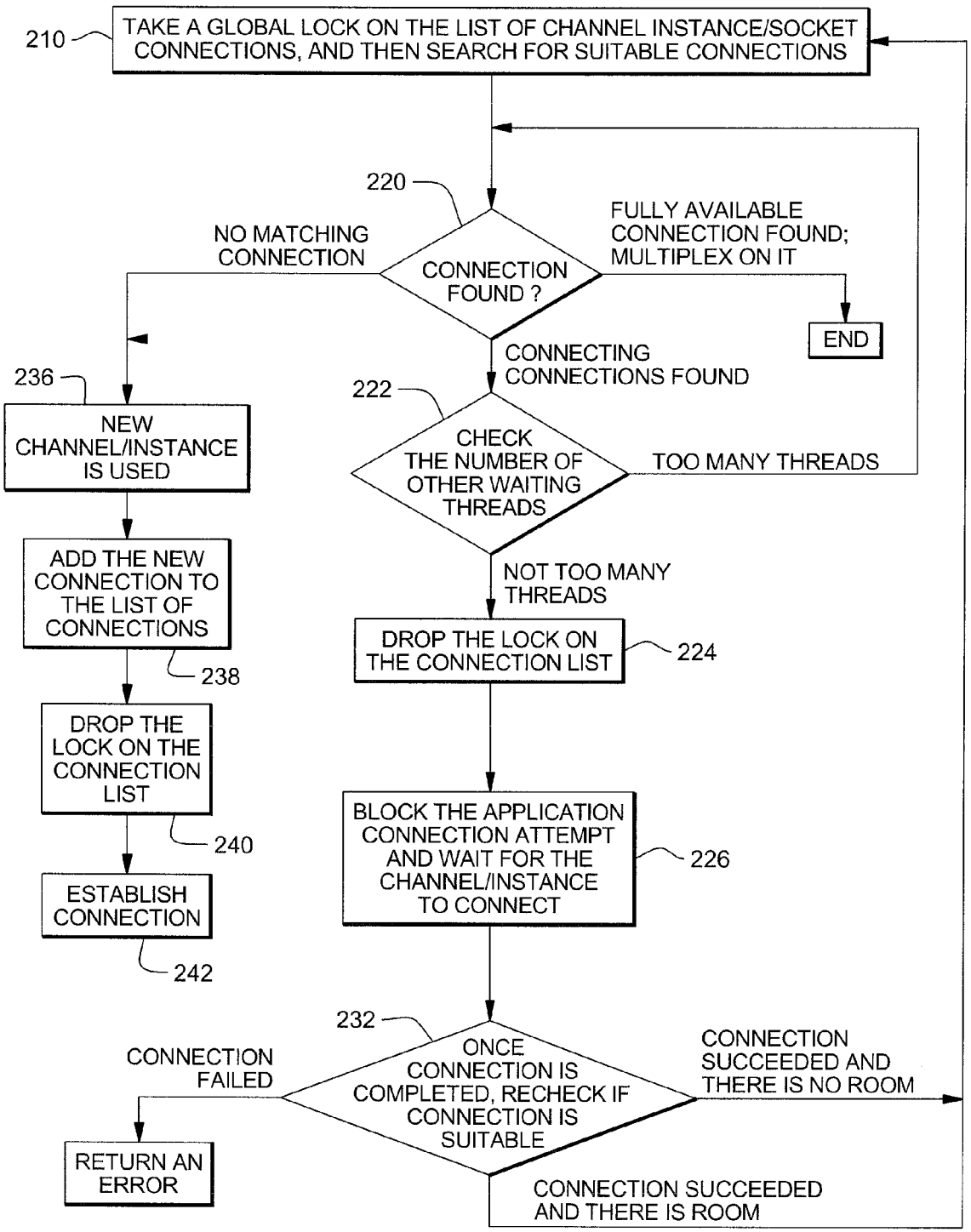
FIG. 2 shows a preferred algorithm for implementing this invention.

FIG. 2 generally shows a preferred algorithm for implementing this invention. At step 210, a global lock is taken on the list of channel instance/socket connections. This list is then searched for suitable connections. For each connection, one of the following results can be observed: (i) not matching; (ii) matching, but the channel instance/socket connection failed or has been disconnected; (iii) matching, connected and available; (iv) matching, but full; and (v) matching, but the attempt to connect the channel instance/socket is not yet complete.

In cases (i) and (ii), the algorithm moves onto the next channel instance/socket connection on the list. In the case of result (iii), the request will subsequently be multiplexed on to the matching channel instance. Result (iv) occurs if all possible slots for multiplexed connections have been used. A variable is held which contains the number of application connections a full channel instance/socket contains. If multiple full entries matching these channel's details are found, the lowest value is held. If all possible slots for multiplexed connections have been used, the algorithm moves on to the next channel instance/socket connection on the list. In case of result (v), this connection is added to a list of possible channel instance instance/socket connections.

Step 220 is to decide whether a suitable connected channel instance/socket has been found. If no connection was found, which can be immediately used, and a list of possible connecting channel instance/socket connections exists, then the following steps are performed.

At step 222, if connection attempts which were still connecting were found in step 210, then the algorithm checks the number of other threads that are waiting for this connection to complete. A positive outcome—there are not too many threads waiting at the moment—leads to box 224. A negative outcome—there are too many threads waiting at the moment—leads to this channel instance being removed from the list of possible connecting channel instance/socket connections, and the flow returns to box 220. We may have more possible connecting channel instance/socket connections, in which case the flow subsequently returns to box 222, but if we do not have any more possible connecting channel instance/socket connections, the flow then goes to box 236.

At step 224, if waiting for this connection to complete, the lock on the connection list is dropped before blocking. If this stage is reached, the algorithm does not continue without returning to the beginning of the logic to regain the lock. At step 226, the application connection attempt is blocked and the algorithm waits for the channel instance to connect. When the channel instance connection completes, the algorithm proceeds to step 232. At this step, all the threads that are waiting for the channel instance/socket connection to complete when posted are awoken.

Also, once complete, at step 232, the algorithm rechecks if this channel instance/socket connection is suitable. One of three results can occur: (a) connected and available; (b) connection failed; (c) channel instance is full. If the channel instance is connected and available, then the algorithm returns to step 210 to rescan, with the likelihood that the connection will multiplex on to this channel instance. If the connection failed, a failure notification is returned to the application. A connection can be full if there was no previous full connection from which to choose how many threads to block, or if the number of multiplexing slots has been altered on the remote end of the channel instance and has been renegotiated to a value which will not leave room for this connection to start. If this is the case, the algorithm updates the lowest full variable as necessary, and returns to 210 to rescan.

If, at step 220, no suitable fully available nor in progress connection was found, then the algorithm proceeds from step 220 to step 236 and a new channel instance/socket is created to the remote server using the following steps. At step 238, the new channel instance/socket connection is added to the list of these connections. At step 240, the lock on the list of connections is dropped, so that other threads can perform connection attempts, or block on completion of this connection. Then, at step 242, the channel instance/socket to the remote end of the connection is established.

The preferred embodiment of the invention provides a number of important advantages. For instance, because the application connection requests are queued, once the channel instance connection attempt succeeds, we are immediately informed and can reattempt without a delay and so can generally multiplex very rapidly on the newly-connected channel instance. Also, the approach of this invention allows limits to be placed on the number of application connections that can be multiplexed across a particular communications channel instance to allow for a balance between efficient functioning and the savings associated with multiplexing. The multiplexing limit can also be used to ignore a matching channel instance on which we would exceed the limit. This allows the application connection attempt to move immediately on to another matching channel instance, which may have free multiplexing space, or on to starting its own communications channel instance.

Figure 3:
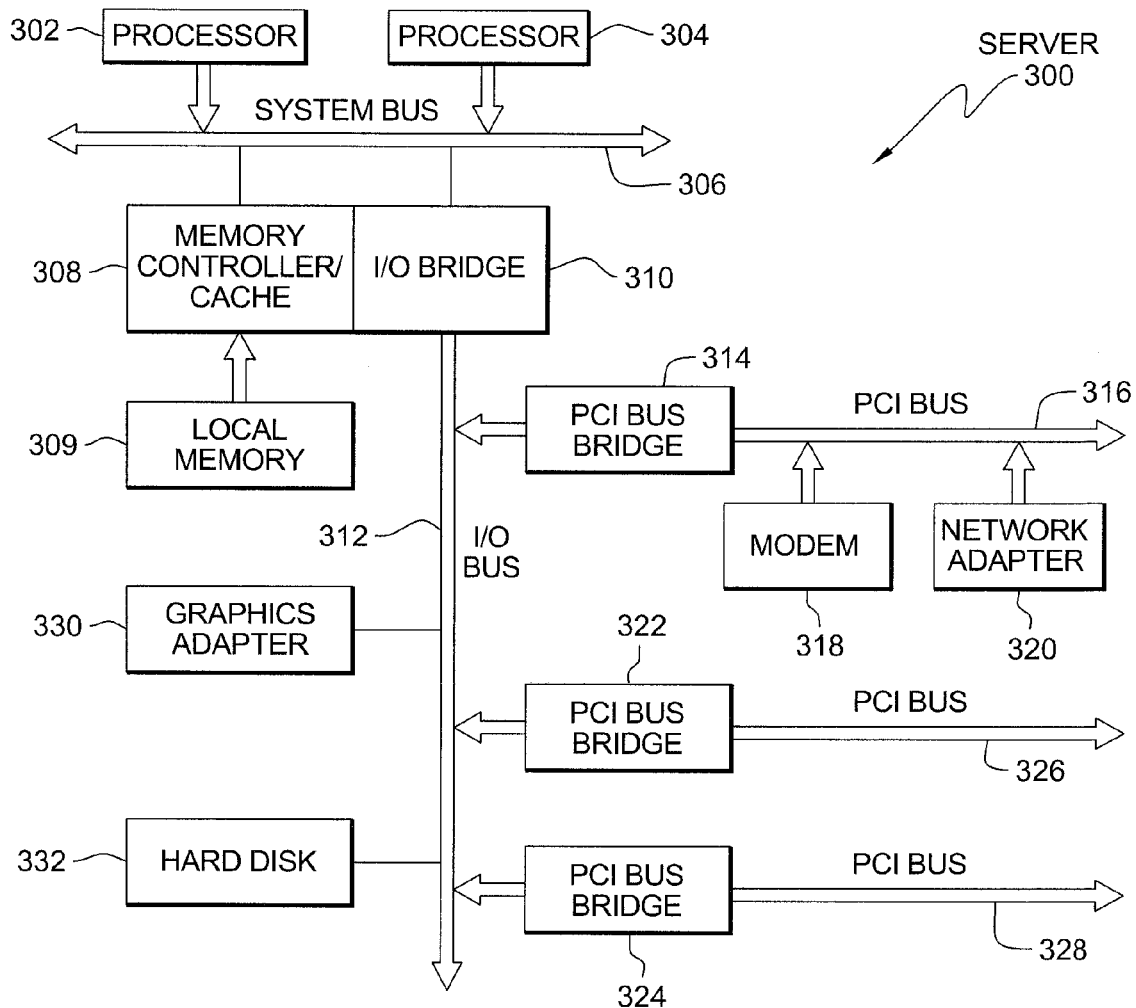
FIG. 3 is a block diagram illustrating a data processing system that may be implemented as a server in the environment of FIG. 1.

Referring to FIG. 3, a block diagram depicts a data processing system that may be implemented as a server, such as server 112 in FIG. 1, in accordance with the present invention. Data processing system 300 may be a symmetric multiprocessor (SMP) system including a plurality of processors 302 and 304 connected to system bus 306. Alternatively, a single processor system may be employed. Also connected to system bus 306 is memory controller/cache 308, which provides an interface to local memory 309. I/O bus bridge 310 is connected to system bus 306 and provides an interface to I/O bus 312. Memory controller/cache 308 and I/O bus bridge 310 may be integrated as depicted.

Peripheral component interconnect (PCI) bus bridge 316 connected to I/O bus 312 provides an interface to PCI local bus 316. A number of modems 318-320 may be connected to PCI bus 316. Typical PCI bus implementations support four PCI expansion slots or add-in connectors. Communications links to network computers in FIG. 1 may be provided through modem 318 and network adapter 320 connected to PCI local bus 316 through add-in boards.

Additional PCI bus bridges 322 and 324 provide interfaces for additional PCI buses 326 and 328, from which additional modems or network adapters may be supported. In this manner, server 300 allows connections to multiple network computers. A memory-mapped graphics adapter 330 and hard disk 332 may also be connected to I/O bus 312 as depicted, either directly or indirectly.

Those of ordinary skill in the art will appreciate that the hardware depicted in FIG. 3 may vary. For example, other peripheral devices, such as optical disk drives and the like, also may be used in addition or in place of the hardware depicted. The depicted example is not meant to imply architectural limitations with respect to the present invention.

The data processing system depicted in FIG. 3 may be, for example, an IBM RISC/System 6000, a product of International Business Machines Corporation in Armonk, N.Y., running the Advanced Interactive Executive (AIX) operating system.

Figure 4:
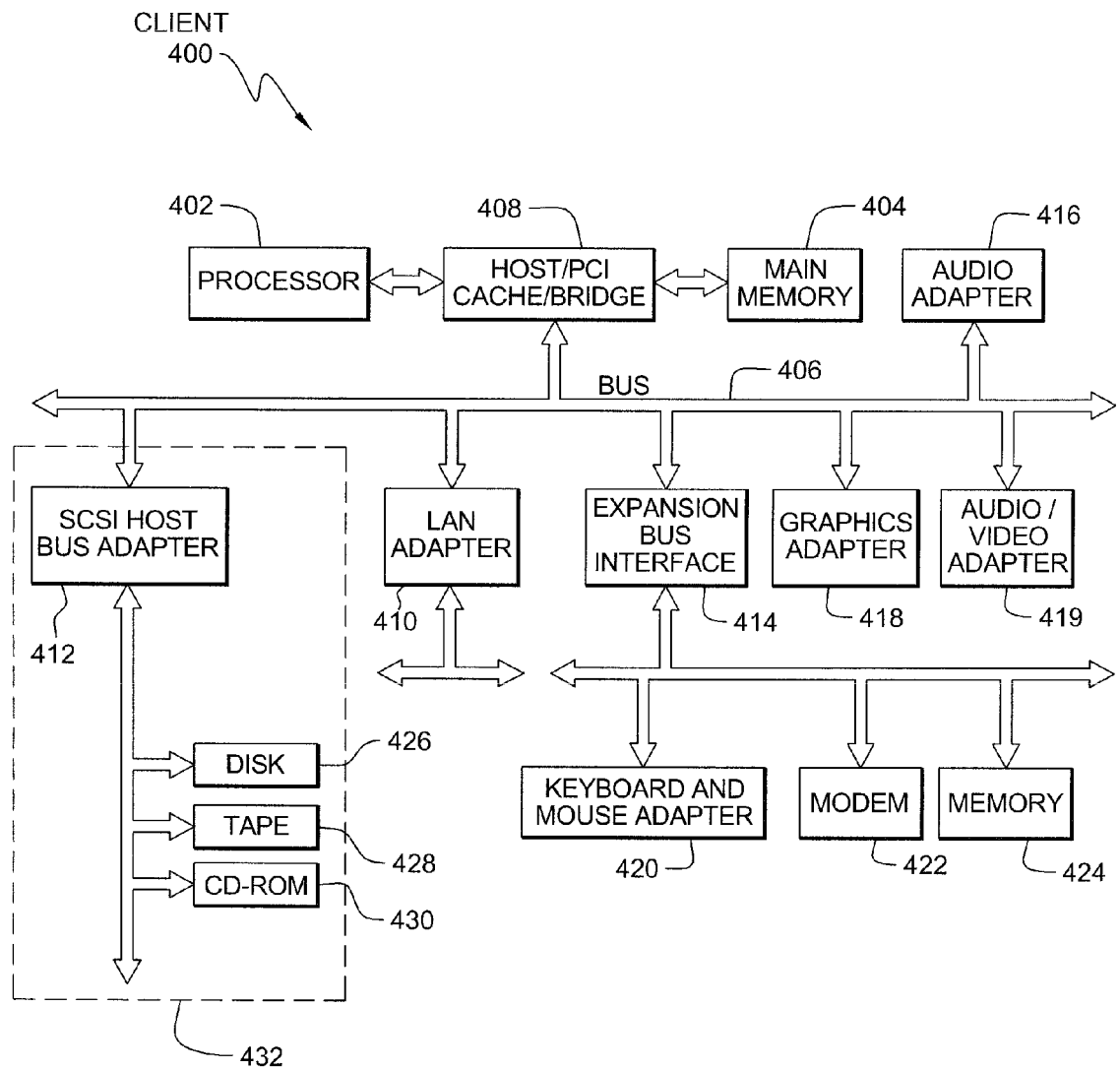
FIG. 4 is a block diagram depicting a data processing system that may be implemented as a client in the environment of FIG. 1.

With reference now to FIG. 4, a block diagram illustrates a data processing system that may be implemented as a client, such as client 112 in FIG. 1, in accordance with the present invention. Data processing system 400 is an example of a client computer. Data processing system 400 employs a peripheral component interconnect (PCI) local bus architecture. Although the depicted example employs a PCI bus, other bus architectures, such as Micro Channel and ISA, may be used. Processor 402 and main memory 404 are connected to PCI local bus 406 through PCI bridge 408. PCI bridge 408 also may include an integrated memory controller and cache memory for processor 402.

Additional connections to PCI local bus 406 may be made through direct component interconnection or through add-in boards. In the depicted example, local area network (LAN) adapter 410, SCSI host bus adapter 412, and expansion bus interface 414 are connected to PCI local bus 406 by direct component connection. In contrast, audio adapter 416, graphics adapter 418, and audio/video adapter 419 are connected to PCI local bus 406 by add-in boards inserted into expansion slots. Expansion bus interface 414 provides a connection for a keyboard and mouse adapter 420, modem 422, and additional memory 424. SCSI host bus adapter 412 provides a connection for hard disk drive 426, tape drive 428, and CD-ROM drive 430. Typical PCI local bus implementations will support three or four PCI expansion slots or add-in connectors.

An operating system runs on processor 402 and is used to coordinate and provide control of various components within data processing system 400 in FIG. 4. The operating system may be a commercially available operating system. An object oriented programming system such as Java may run in conjunction with the operating system and provides calls to the operating system from Java programs or applications executing on data processing system 400. "Java" is a trademark of Sun Microsystems, Inc. Instructions for the operating system, the object-oriented operating system, and applications or programs are located on storage devices, such as hard disk drive 426, and may be loaded into main memory 304 for execution by processor 402.

Those of ordinary skill in the art will appreciate that the hardware in FIG. 4 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 400, if optionally configured as a network computer, may not include SCSI host bus adapter 412, hard disk drive 426, tape drive 428, and CD-ROM 430, as noted by dotted line 432 in FIG. 4, denoting optional inclusion. In that case, the computer, to be properly called a client computer, must include some type of network communication interface, such as LAN adapter 410, modem 422, or the like. As another example, data processing system 400 may be a stand-alone system configured to be bootable without relying on some type of network communication interface, whether or not data processing system 400 comprises some type of network communication interface. As a further example, data processing system 400 may be a Personal Digital Assistant (PDA) device which is configured with ROM and/or flash ROM in order to provide non-volatile memory for storing operating system files and/or user-generated data.

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of selecting a channel instance for connecting a client application with a server application in a multi-channel computer system including a multitude of client applications, a multitude of server applications and a multitude of channel instances for connecting the client applications with the server applications, and wherein when one of the channel instances is used to connect one of the client applications with one of the server applications, defined channel instance information is established for said one of the channel instances, the method comprising the steps of:
   when a new application connection request is made, locking existing channel instance information;
   after said locking, scanning through a list of locked channel instance connections for one of the locked channel instances that is a candidate channel instance for said new application connection request; and
   after finding a candidate channel instance, determining whether the candidate channel instance is currently suitable for the new application connection request; and unlocking the existing channel instance information; and
   wherein the existing channel instance information is locked when a new application connection request is made, and the existing channel instance information is not locked while each new channel instance connection is completed.

2. A method according to claim 1, comprising the further step of, if the candidate channel instance is not in the process of connecting, adding the new application connection request onto the candidate channel instance.

3. A method according to claim 1, comprising the further step of, if the candidate channel instance is in the process of connecting, adding the new application connection request onto a wait list for the candidate channel instance if given criteria are met.

4. A method according to claim 3, wherein the given criteria include less than a given number of application connection requests are on said wait list.

5. A method according to claim 4, wherein said given number is variable.

6. A method according to claim 3, comprising the further step of, if the given criteria are not met, using a new channel instance for the new application connection request.

7. A method according to claim 3, wherein the adding step includes the steps of:
   completing the connecting of the candidate channel instance; and
   when the candidate channel instance completes connecting, rescanning through the list of channel instance connections for any channel instances on the list of channel instance connections that are suitable for any of the application connection requests on the wait list.

8. A method according to claim 1, wherein the scanning step includes the steps of:
   scanning through the list of channel instance connections for a completed or incomplete channel instance connection that is suitable for the new application connection request.

9. A method according to claim 8, comprising the further step of, if no suitable completed or incompleted channel instance connection is found during the scanning step, then starting a new channel instance connection for the application connection request.

10. A method according to claim 9, comprising the further step of, for each of the multitude of matching channel instances, identifying a variable limit on the number of application connections that can be placed on said each channel instance.

11. The method according to claim 1, wherein
   the candidate channel instance is incomplete;
   comprising the further steps of, after unlocking the existing channel instance information, completing the candidate channel instance, and re-checking to determine if the completed candidate channel instance is suitable for the new application connection request.

12. The method according to claim 11, comprising the further steps of:
   after said re-checking, re-locking existing channel instance information, and re-scanning through the list of channel instance connections for one of the channel instances that is a potential channel instance for said new application connection request.

13. A channel instance selection system for selecting a channel instance for connecting a client application with a server application in a multi-channel computer system including a multitude of client applications, a multitude of server applications and a multitude of channel instances for connecting the client applications with the server applications, and wherein when one of the channel instances is used to connect one of the client applications with one of the server applications, defined channel instance information is established for said one of the channel instances, the channel instance selection system comprising:
   at least one hardware processing unit, implementing a channel instance selection program, configured to:
   when a new application connection request is made, locking existing channel instance information;
   after said locking, scanning through a list of locked channel instance connections for one of the locked channel instances that is a candidate channel instance for said new application connection request; and
   after finding a candidate channel instance, determining whether the candidate channel instance is currently suitable for the new application connection request, and unlocking the existing channel instance information; and wherein the existing channel instance information is locked when a new application connection request is made, and the existing channel instance information is not locked while each new channel instance connection is completed.

14. A channel instance selection system according to claim 13, wherein the at least one processing unit is further configured to:
   a. if the candidate channel instance is not in the process of connecting, adding the new application connection request onto the candidate channel instance; and
   b. if the candidate channel instance is in the process of connecting, adding the new application connection request onto a wait list for the candidate channel instance if given criteria are met.

15. A channel instance selection system according to claim 14, wherein the at least one processing unit is further configured for to using a new channel instance for the new application connection request under defined conditions.

16. A channel instance selection system according to claim 14, wherein the given criteria include less than a given, adjustable number of application connection requests are on said wait list.

17. A channel instance selection system according to claim 13, wherein the scanning is done by:
   scanning through the list of channel instance connections for a completed or incompleted channel instance connection that is suitable for the new application connection request; and
   if no suitable completed or incompleted channel instance connection is found during the again scanning step, then starting a new channel instance connection for the application connection request.

18. An article of manufacture comprising:
   at least one computer usable tangible-device having computer readable program code logic tangibly embodied therein to execute a machine instruction in a processing unit for selecting a channel instance for connecting a client application with a server application in a multi-channel computer system including a multitude of client applications, a multitude of server applications and a multitude of channel instances for connecting the client applications with the server applications, and wherein when one of the channel instances is used to connect one of the client applications with one of the server applications, defined channel instance information is established for said one of the channel instances, said computer readable program code logic, when executing, performing the following steps:
   when a new application connection request is made, locking existing channel instance information;
   after said locking, scanning through a list of locked channel instance connections for one of the locked channel instances that is a candidate channel instance for said new application connection request; and
   after finding a candidate channel instance, determining whether the candidate channel instance is currently suitable for the new application connection request, and unlocking the existing channel instance information; and
   wherein the existing channel instance information is locked when a new application connection request is made, and the existing channel instance information is not locked while each new channel instance connection is completed.

19. An article of manufacture according to claim 18, wherein the computer readable program and logic, when executing, performs the further the steps of:
   a. if the candidate channel instance is not in the process of connecting, adding the new application connection request onto the candidate channel instance; and
   b. if the candidate channel instance is in the process of connecting, adding the new application connection request onto a wait list for the candidate channel instance if given criteria are met.

20. An article of manufacture according to claim 19, wherein the computer readable program code logic, when executing, performs the further step of, if the candidate channel instance is in the process of connecting, and said given criteria are not met, then using a new channel instance for the new application connection request.

* * * * *